United States Patent
Backman

Patent Number: 5,077,944
Date of Patent: Jan. 7, 1992

[54] CURBSTONE

[75] Inventor: Hans Backman, Kristinehamn, Sweden

[73] Assignee: EBI Producter HB, Kristinehamn, Sweden

[21] Appl. No.: 574,910

[22] Filed: Aug. 17, 1990

[30] Foreign Application Priority Data

Sep. 6, 1989 [SE] Sweden .................. 8902933

[51] Int. Cl.$^5$ .................. E01C 11/22; E02D 27/00
[52] U.S. Cl. .................. 52/102; 404/7
[58] Field of Search .................. 404/7; 47/33; 52/102, 52/108, 150, 151, 152

[56] References Cited

U.S. PATENT DOCUMENTS

| | | | |
|---|---|---|---|
| 2,002,311 | 5/1935 | Corwin | 52/311 |
| 2,115,868 | 5/1938 | McIntosh | 52/102 |
| 2,951,001 | 8/1960 | Rubenstein | 52/311 |
| 3,762,113 | 10/1973 | O'Mullan et al. | 52/102 |
| 4,176,982 | 12/1979 | Boswell | 404/7 |

Primary Examiner—Ramon S. Britts
Assistant Examiner—Nancy Connolly
Attorney, Agent, or Firm—Dennison, Meserole, Pollack & Scheiner

[57] ABSTRACT

When laying solid curbstones a ditch must be dug into which the curbstone is placed. The ditch is then filled in order to support the curbstone. The ditch-digging is eliminated according to the present invention in that a continuous shell (1) with coating (2) of stone is placed on a supporting surface and anchored by a rod (4) which passes through a hole in one side wall, through a hole in the bottom and penetrates into the support surface.

1 Claim, 1 Drawing Sheet

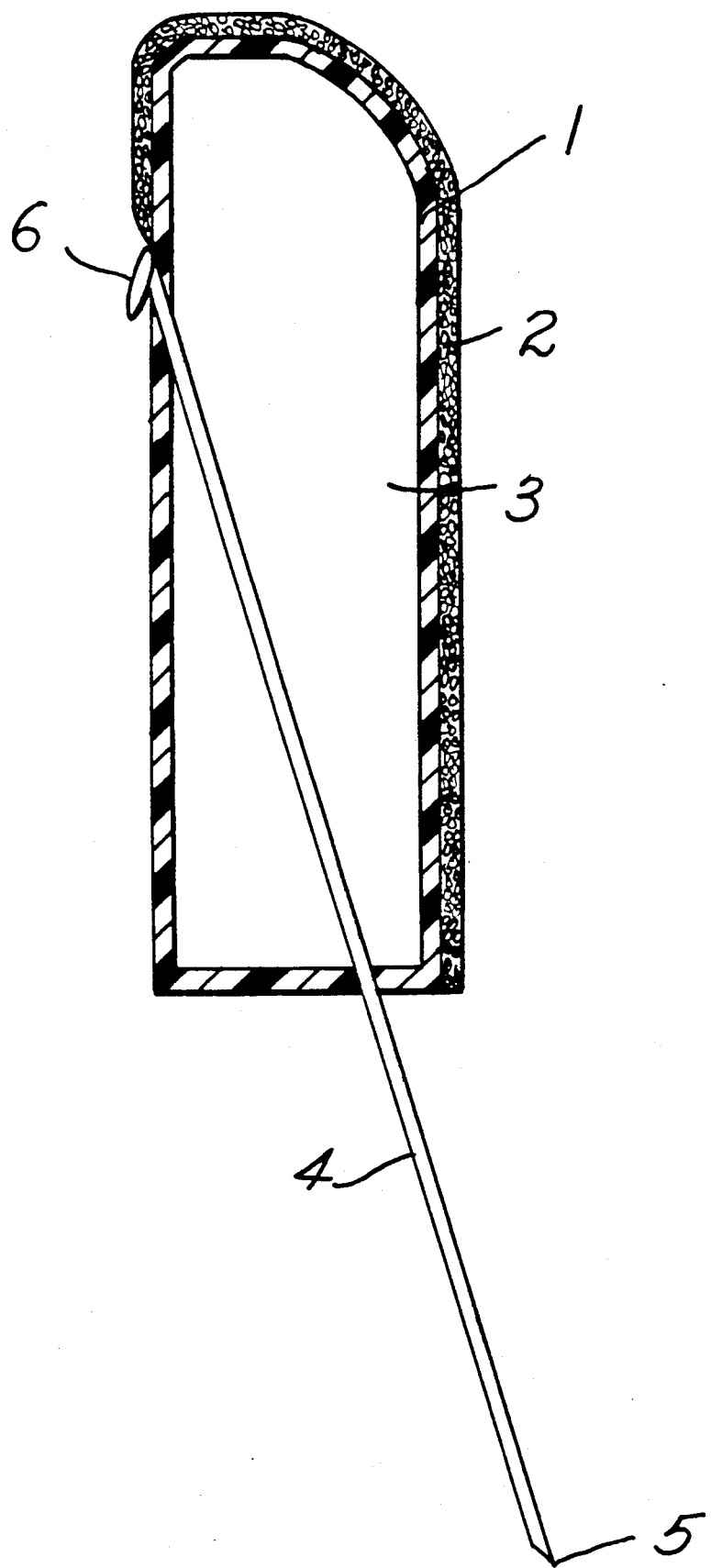

CURBSTONE

BACKGROUND OF THE INVENTION

The present invention relates to a curbstone. Curbstones are usually used to define the edges of flowerbeds, for instance, when laying out gardens. When such an edge is to be defined a small ditch must be dug into which the curbstones are lowered. The curbstones are generally cast in cement and may have a surface coating of small stones. The arrangement of the ditch means that half the height of the curbstone will be below ground and a small part, perhaps a third, will be visible. When the curbstone has been correctly positioned the ditch is filled in on both sides of the curbstones. This is the conventional and normal procedure in order to surround the flowerbed with curbstones.

SUMMARY OF THE INVENTION

The above-mentioned method of edging a flowerbed entails a considerable waste of time, both in digging the ditch and in positioning the curbstones in the ditch, and the object of the present invention is thus to effect a lighter curbstone and to offer a considerably simpler method of positioning curbstones. This is achieved using a continuous shell with a cross section equivalent to the cross section of a solid curbstone and coating it externally with a layer of small stones. The hollow curbstone is given a height corresponding to the visible part of a conventional curbstone. The hollow curbstone being provided with a hole in one side wall and with a hole in the bottom surface. An anchoring rod or pin having a stop at its rear end to prevent it from leaving the hollow curbstone, is passed through these two holes. Thanks to this rod, a hollow curbstone can be placed directly on the ground and the rod or pin is then passed through the two holes and down into the support surface on which the curbstone is placed. It is thus evident that it is extremely simple to achieve a surround of curbstones in accordance with the present invention since it is only necessary to place the curbstones as desired on the surface of the ground and then anchor them with the rod or pin passing through the curbstone.

DESCRIPTION OF THE DRAWING

The drawing shows a cross section through a curbstone according to the invention.

DESCRIPTION OF THE INVENTION

The present invention will be described in more detail with reference to the accompanying drawing which shows a cross section through a curbstone according to the invention, provided with an anchoring rod. In the drawing, 1 is a continuous shell of plastic. If a certain length of curbstone is considered it is evident that the shell is in the form of a pipe. The surface of the shell is coated with a layer 2 of small stones which may be applied by a glueing process, for instance. The shell thus acquires the same external appearance as a solid curbstone. The shell thus surrounds a cavity 3. On its left-hand wall the shell is provided with a hole through which a rod or pin 4 is inserted. The pin continues out through a hole in the bottom of the shell, and then penetrates into the surface on which the curbstone is placed. Penetration into the supporting surface is facilitated by the pin or rod 4 having a point 5. The upper end of the rod is provided with a stop 6, thus enabling the rod to pass fully through the two holes, but cannot leave the upper hole in the side wall.

Solid curbstones are extremely heavy and are therefore troublesome to work with. The curbstone according to the present invention is extremely light and a great deal of time is saved by not having to dig a ditch, but merely placing the curbstones on the ground as desired without any special preparatory work. When this has been done, the rods or pins 4 in each curbstone are hammered in, thus producing a first-class edging of stones around a flowerbed, for instance.

I claim:

1. In a assembly for use in forming an edging along the ground, a preformed curbstone comprising an elongate hollow shell having a bottom wall engageable with the ground, laterally spaced side walls extending upwardly from said bottom wall, and a top wall portion extending between said side walls vertically above said bottom wall to define an internal cavity, a pair of aligned holes, an elongate anchor rod having a ground penetrating point and an upper end with a stop thereon and engageable with said one side wall for mutual retention of said rod in said aligned holes and said curbstone on said rod, one of said aligned holes being disposed in said bottom wall outwardly spaced from one side wall and the second of said aligned holes being disposed in said one side wall vertically spaced above said bottom wall and diagonally aligned with said one hole across said shell for positioning of said elongate anchor rod within and through both holes and at an angle into the ground for an engagement of the rod with said one side wall and said bottom wall of said shell, said engagement providing stable positioning and anchoring of said curbstone to the ground and preventing laterally shifting of said curbstone.

* * * * *